(12) United States Patent
Lai

(10) Patent No.: US 11,073,172 B2
(45) Date of Patent: Jul. 27, 2021

(54) TELESCOPING ASSEMBLY

(71) Applicant: Hsin-Yuan Lai, Taichung (TW)

(72) Inventor: Hsin-Yuan Lai, Taichung (TW)

(*) Notice: Subject to any disclaimer, the term of this patent is extended or adjusted under 35 U.S.C. 154(b) by 423 days.

(21) Appl. No.: 16/274,514

(22) Filed: Feb. 13, 2019

(65) Prior Publication Data
US 2020/0109728 A1    Apr. 9, 2020

(30) Foreign Application Priority Data

Oct. 9, 2018    (TW) .................................. 107213657

(51) Int. Cl.
*F16B 7/10*    (2006.01)
*A45B 9/00*    (2006.01)

(52) U.S. Cl.
CPC ........ *F16B 7/105* (2013.01); *A45B 2009/007* (2013.01)

(58) Field of Classification Search
CPC .......................... F16B 7/105; A45B 2009/007
See application file for complete search history.

(56) References Cited

U.S. PATENT DOCUMENTS

| 6,338,587 | B1* | 1/2002 | Kuo | A45C 13/262 16/113.1 |
| 8,147,358 | B2* | 4/2012 | Chen | F16B 7/105 473/492 |
| 10,030,681 | B2 | 7/2018 | Lai | |
| 2020/0378422 | A1* | 12/2020 | Chou | F16B 7/105 |

* cited by examiner

*Primary Examiner* — Anita M King
(74) *Attorney, Agent, or Firm* — Burris Law, PLLC

(57) ABSTRACT

A telescoping assembly includes a first tube member, a second tube member, an inner tubular member coupled to move with said second tube member, an outer sleeve mounted on said first tube member, and a latch block disposed in a latch bore of the outer sleeve and having an actuating end region and a blocking end region. In response to pressing of the actuating end region, the latch block is displaced from a locked position, where the blocking end region is in blocking engagement with a shoulder surface of the inner tubular member, to an unlocked position.

5 Claims, 7 Drawing Sheets

TELESCOPING ASSEMBLY

CROSS-REFERENCE TO RELATED APPLICATION

This application claims priority from Taiwanese utility model patent application no. 107213657, filed on Oct. 9, 2018.

FIELD

The disclosure relates to a telescoping assembly, more particularly to a telescoping assembly with a simplified structure.

BACKGROUND

Taiwanese utility model patent No. M508619, corresponding to U.S. counterpart patent No. 10,030,681 B2, discloses a conventional telescopic tube assembly which includes a telescopic tube subassembly having first and second tubes, a tubular member configured to move with the second tube, an outer sleeve sleeved on the first tube, a retaining member, an actuating member, and a biasing member. When the second tube is in an extended position, the second tube extends out of the first tube, and the retaining member is engaged in a cavity of the tubular member so as to guard against axial movement of the second tube. When the second tube is in a retracted position, the second tube is received in the first tube, and the retaining member is retracted to be disengaged from the cavity so as to permit the axial movement of the second tube.

SUMMARY

An object of the disclosure is to provide a novel telescoping assembly which is easily operable and which has a simplified structure.

According to the disclosure, a telescoping assembly includes a first tube member, a second tube unit, an outer sleeve, and a latch block. The first tube member has a first coupling end, and has a first inner peripheral surface which defines a first axial bore. The second tube unit includes a second tube member and an inner tubular member. The second tube member has a second coupling end telescopically connected to the first coupling end along the longitudinal axis, and is axially movable between an extended position, where the second tube member extends out of the first axial bore, and a retracted position, where the second tube member is received in the first axial bore. The inner tubular member is coupled to the second coupling end to move with the second tube member inside the first axial bore, and defines a shoulder surface. The outer sleeve includes an upper segment, a lower segment, and a middle segment. The upper segment is configured to be sleeved on and in frictional engagement with the first coupling end. The lower segment is configured to be slidably engaged with the second tube member so as to permit the second tube member to move relative to the outer sleeve. The middle segment is disposed between the upper and lower segments, and has a first wall region and a second wall region which are opposite to each other in a radial direction relative to the longitudinal axis. The middle segment has a latch bore which extends in the radial direction through the first wall region and into the second wall region to terminate at a limiting surface. The latch block is disposed in the latch bore, and defines therein a through hole for passage of the second tube unit. The latch block includes an actuating end region and a blocking end region which are at two opposite sides of the through hole. The latch block is slidable in the latch bore such that in response to pressing of the actuating end region toward the limiting surface, the latch block is displaced from a locked position, where the blocking end region is in blocking engagement with the shoulder surface to retain the second tube member in the extended position, to an unlocked position, where the blocking end region is disengaged from the shoulder surface.

BRIEF DESCRIPTION OF THE DRAWINGS

Other features and advantages of the disclosure will become apparent in the following detailed description of the embodiment(s) with reference to the accompanying drawings, in which.

DETAILED DESCRIPTION

To aid in describing the disclosure, directional terms may be used in the specification and claims to describe portions of the present disclosure (e.g., front, rear, left, right, top, bottom, etc.). These directional definitions are intended to merely assist in describing and claiming the disclosure and are not intended to limit the disclosure in any way.

Figure 1:
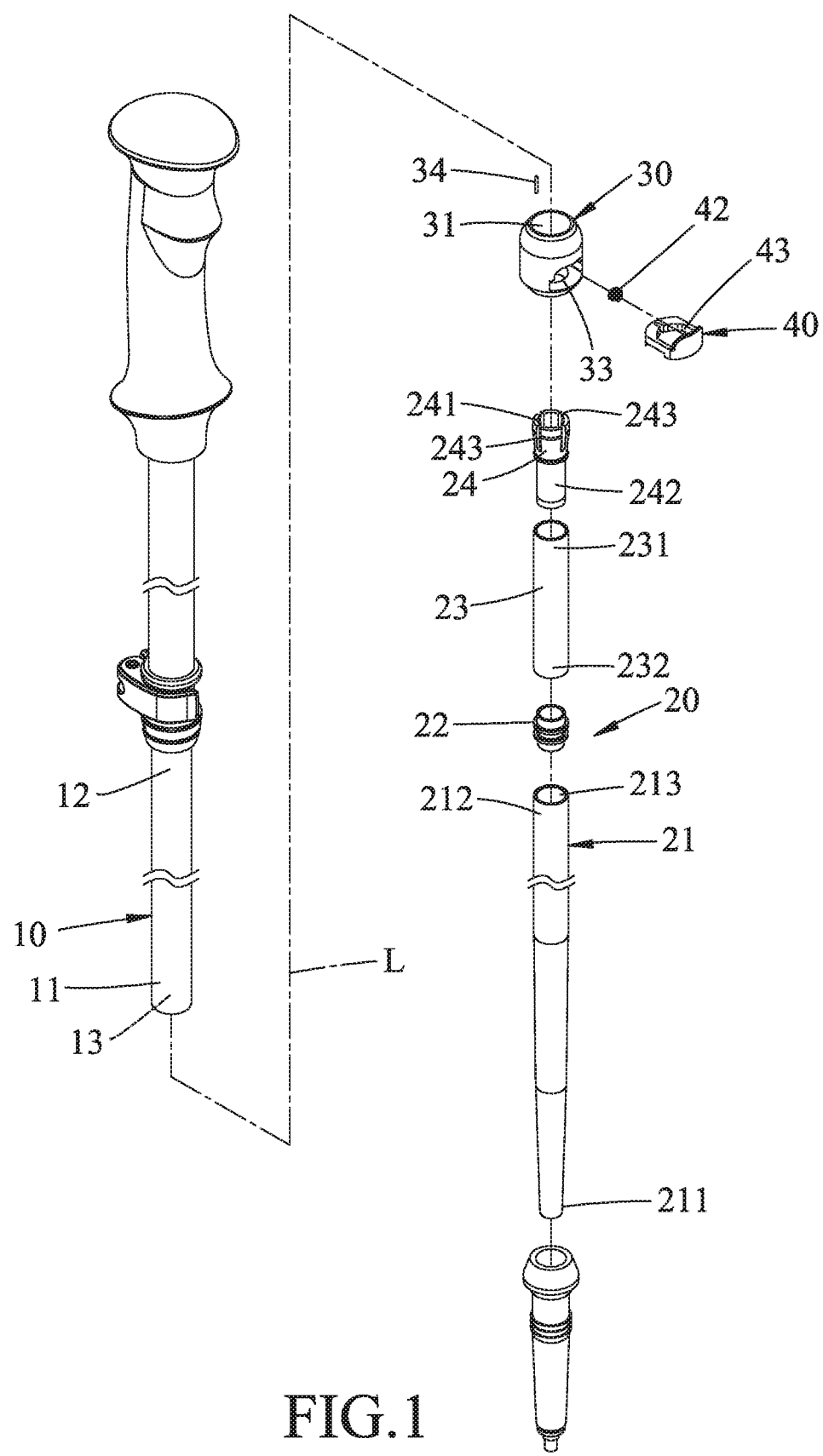
FIG. 1 is an exploded perspective view of a telescoping assembly according to an embodiment of the disclosure.
Figure 2:
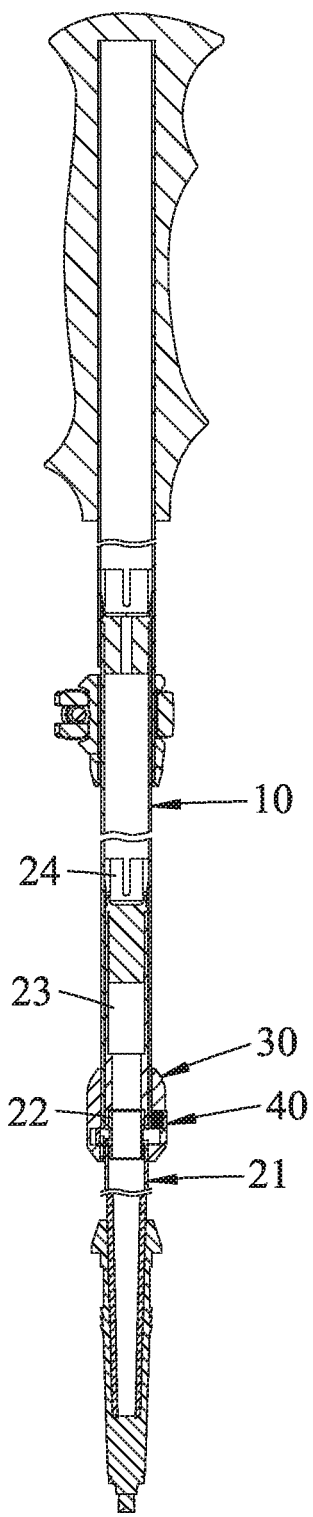
FIG. 2 is a cross-sectional view of the telescoping assembly.
Figure 3:
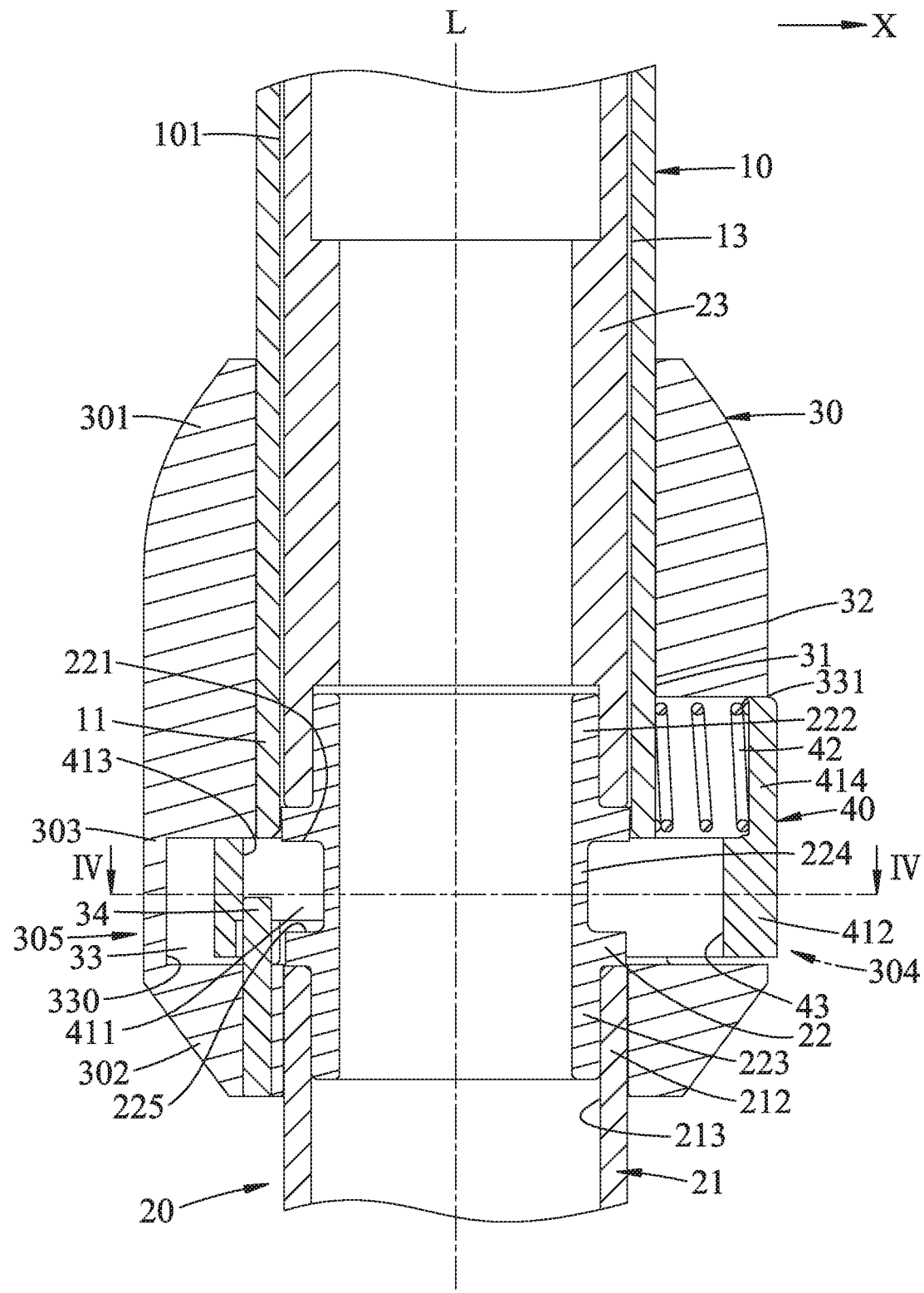
FIG. 3 is a fragmentary enlarged view of FIG. 2 showing a latch block in a locked position.

Referring to FIGS. 1 to 3, a telescoping assembly according to an embodiment of the disclosure is shown to include a first tube member 10, a second tube unit 20, an outer sleeve 30, and a latch block 40. In this embodiment, the telescoping assembly is used as an alpenstock, and the description regarding other elements for the alpenstock are omitted for sake of brevity.

The first tube member 10 has a first coupling end 11 and an upper end 12 opposite to the first coupling end 11 along a longitudinal axis (L). The first tube member 10 has a first inner peripheral surface 101 defining a first axial bore 13 which extends from the first coupling end 11 toward the upper end 12.

The second tube unit 20 includes a second tube member 21 and an inner tubular member 22.

Figure 7:
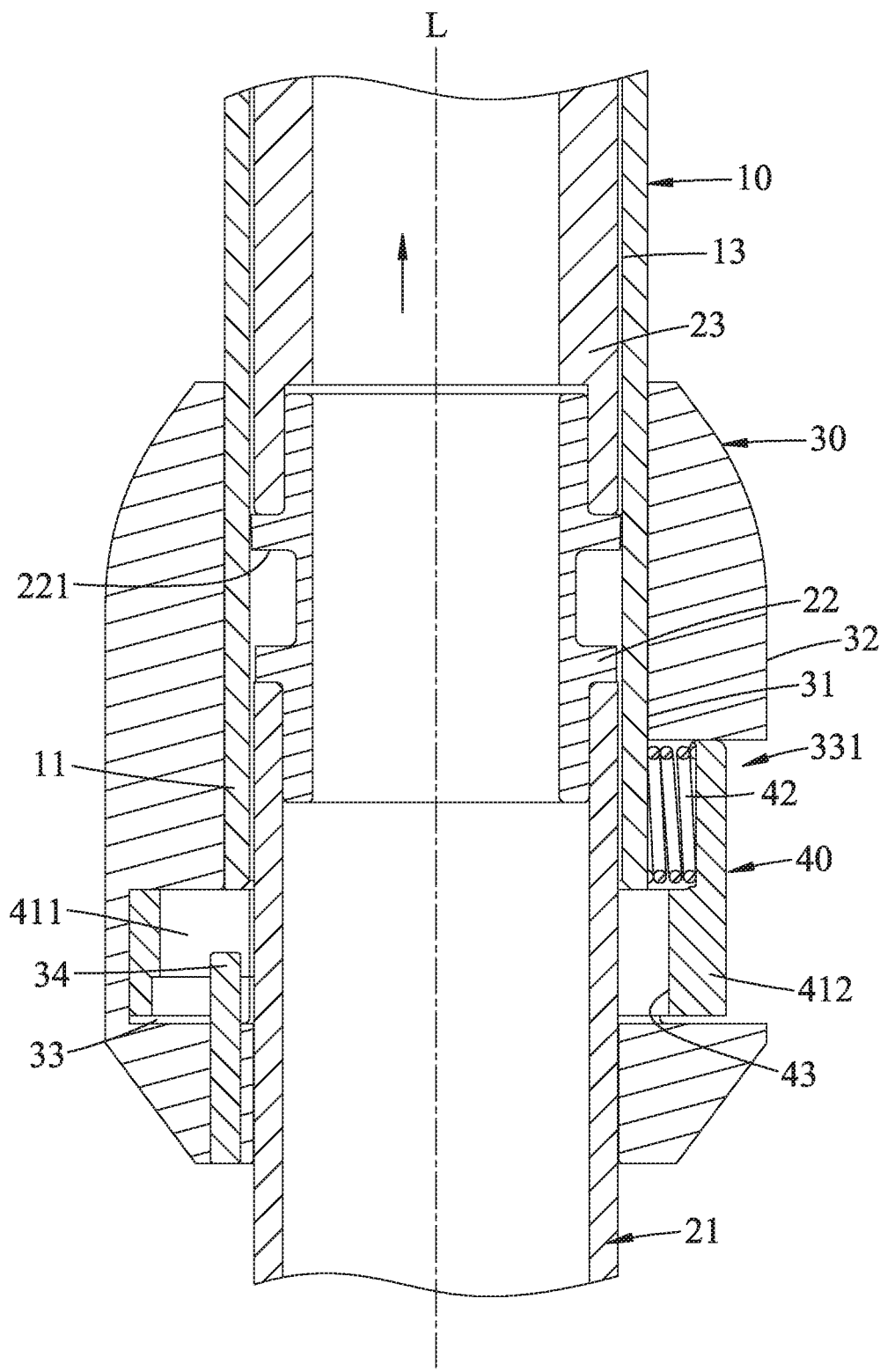
FIG. 7 is similar to FIG. 5 but illustrating a second tube member being moved toward a retracted position.

The second tube member 21 has a lower end 211 and a second coupling end 212 which is opposite to the lower end 211 along the longitudinal axis (L), and which is telescopically connected to the first coupling end 11 along the longitudinal axis (L). The second tube member 21 is axially movable between an extended position and a retracted position. In the extended position, as shown in FIG. 3, the second tube member 21 extends out of the first axial bore 13. In the retracted position, the second tube member 21 is received in the first axial bore 13. FIG. 7 shows the second tube member 21 being moved toward the retracted position.

In an embodiment shown in FIGS. 1 and 3, the second tube member 21 defines therein a second axial bore 213 at the second coupling end 212.

The inner tubular member 22 is coupled to the second coupling end 212 to move with the second tube member 21 inside the first axial bore 13. The inner tubular member 22 defines a shoulder surface 221.

In an embodiment shown in FIG. 3, the inner tubular member 22 has a distal end segment 222, a proximate end segment 223, and a neck portion 224. The proximate end segment 223 is fitted in the second axial bore 213 to permit the inner tubular member 22 to move with the second tube member 20 in the first axial bore 13. The neck portion 224 is disposed between the distal and proximate end segments 222, 223, and forms, with the distal end segment 222, the shoulder surface 221. The neck portion 224 further forms, with the proximate end segment 222, another shoulder surface 225 confronting the shoulder surface 221.

In an embodiment shown in FIGS. 1 and 3, the second tube unit 20 further includes a connection tube 23 and a plug member 24.

The connection tube 23 is disposed in the first axial bore 13, and has a first connection end 231 and a second connection end 232 which is sleeved on and in frictional engagement with the distal end segment 222 so as to permit the connection tube 23 to move with the second tube member 21 along the longitudinal axis (L).

The plug member 24 has an upward segment 241 and a downward segment 242. The downward segment 242 is configured to be in frictional engagement with an inner peripheral surface of the connection tube 23 at the first connection end 231 to permit the plug member 24 to move with the second tube member 21. The upward segment 241 is configured to be in traction engagement with the first inner peripheral surface 101 of the first tube member 10 so as to impede the axial movement of the second tube member 21.

In an embodiment shown in FIG. 1, the upward segment 241 has a plurality of slits 243 extending downwardly from an upper end of the upward segment 241 toward the downward segment 242 so as to enhance the flexibility of the plug member 24.

As shown in FIG. 3, the outer sleeve 30 has an inner peripheral surface 31 and an outer peripheral surface 32, and includes an upper segment 301, a lower segment 302, and a middle segment 303 disposed between the upper and lower segments 301, 302.

The upper segment 301 is configured to be sleeved on and in frictional engagement with the first coupling end 11.

The lower segment 302 is configured to be slidably engaged with the second tube member 21 so as to permit the second tube member 21 to move relative to the outer sleeve 30.

Figure 4:
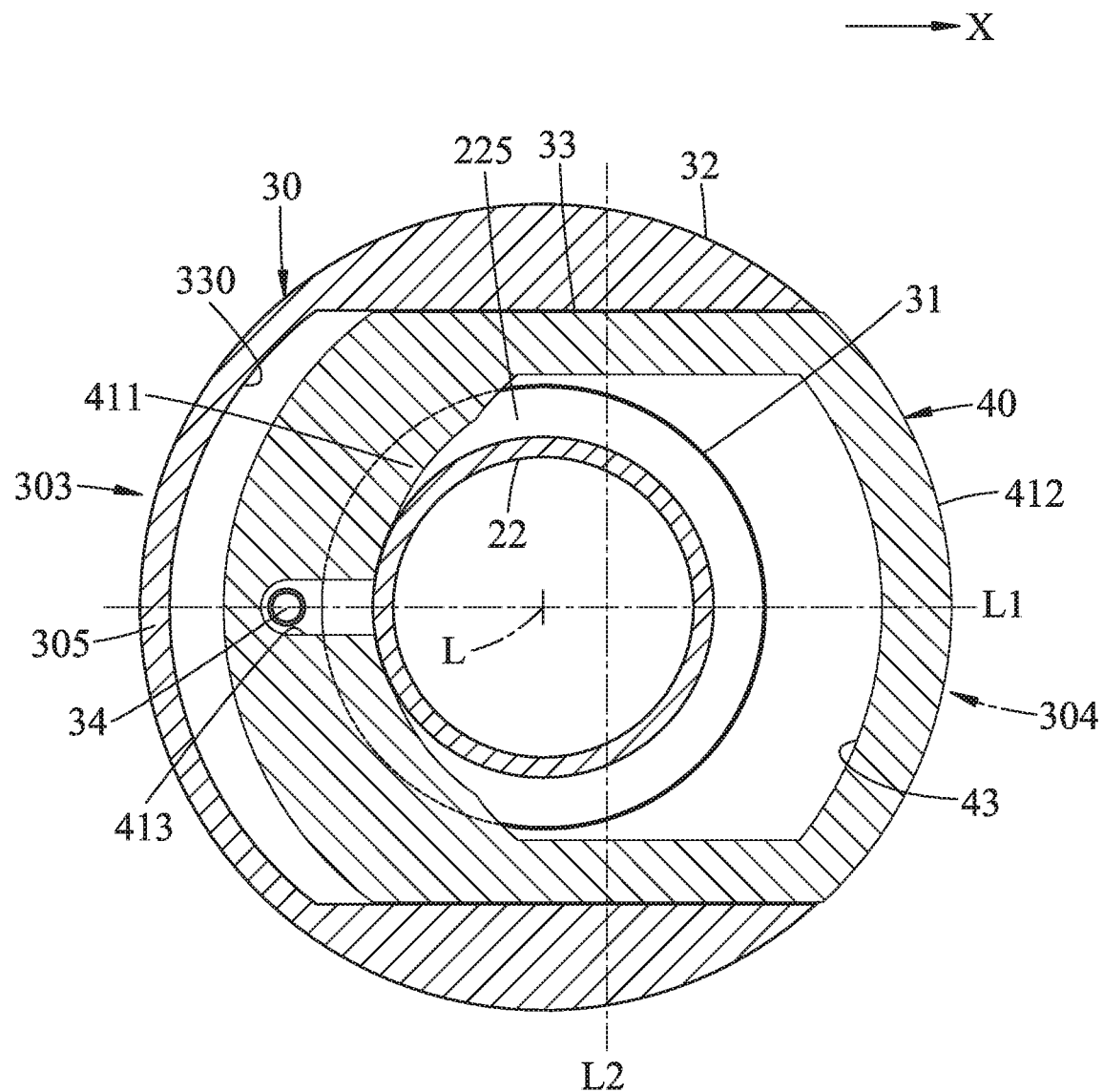
FIG. 4 is a cross-sectional view taken along line IV-IV of FIG. 3.

The middle segment 303 has a first wall region 304 and a second wall region 305 which are opposite to each other in a radial direction (X) relative to the longitudinal axis (L) (see also FIG. 4). The middle segment 303 has a latch bore 33 which extends in the radial direction (X) through the first wall region 304 and into the second wall region 305 to terminate at a limiting surface 330.

Figure 5:
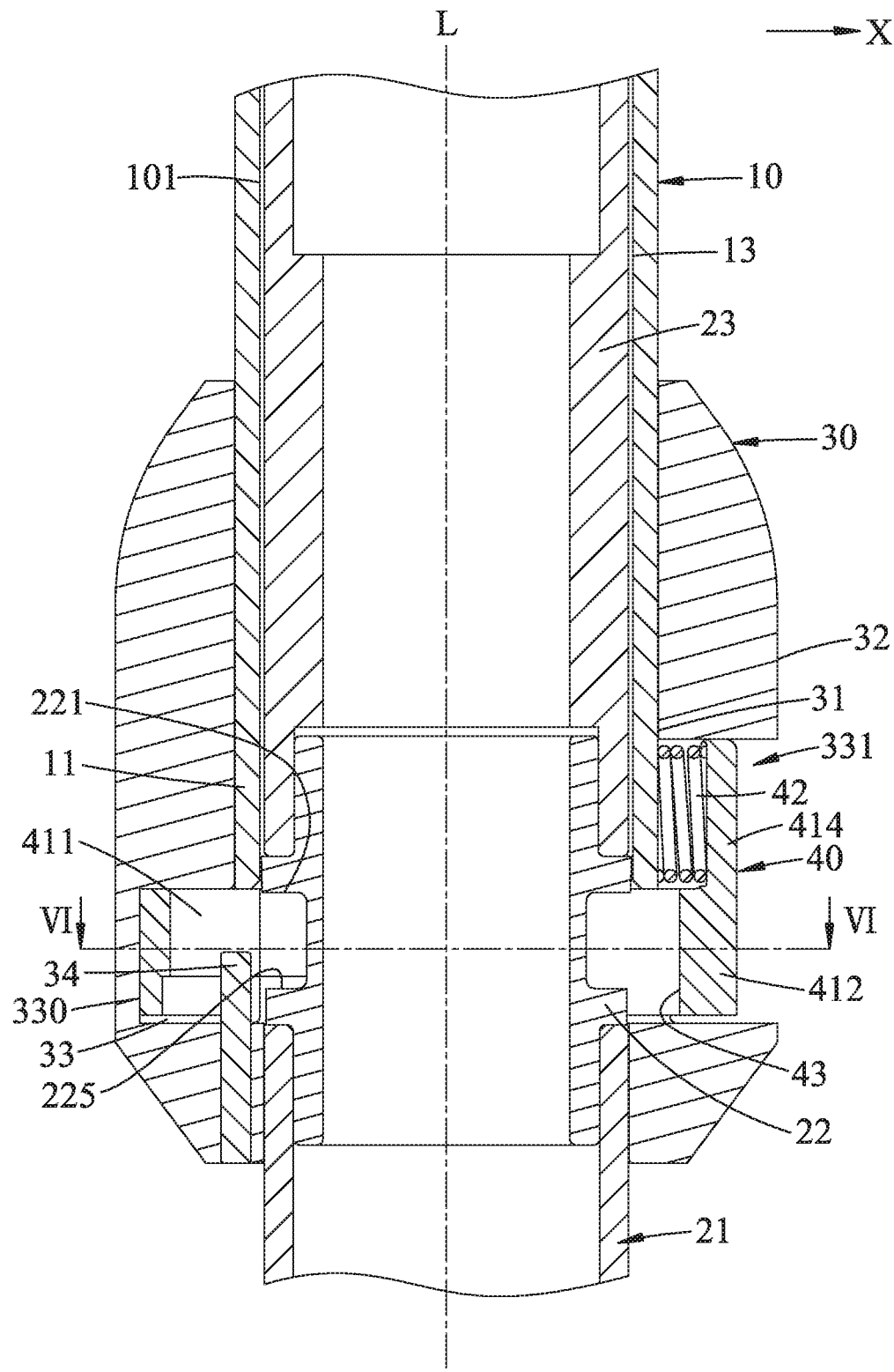
FIG. 5 is similar to FIG. 3 but illustrating the latch block in an unlocked position.
Figure 6:
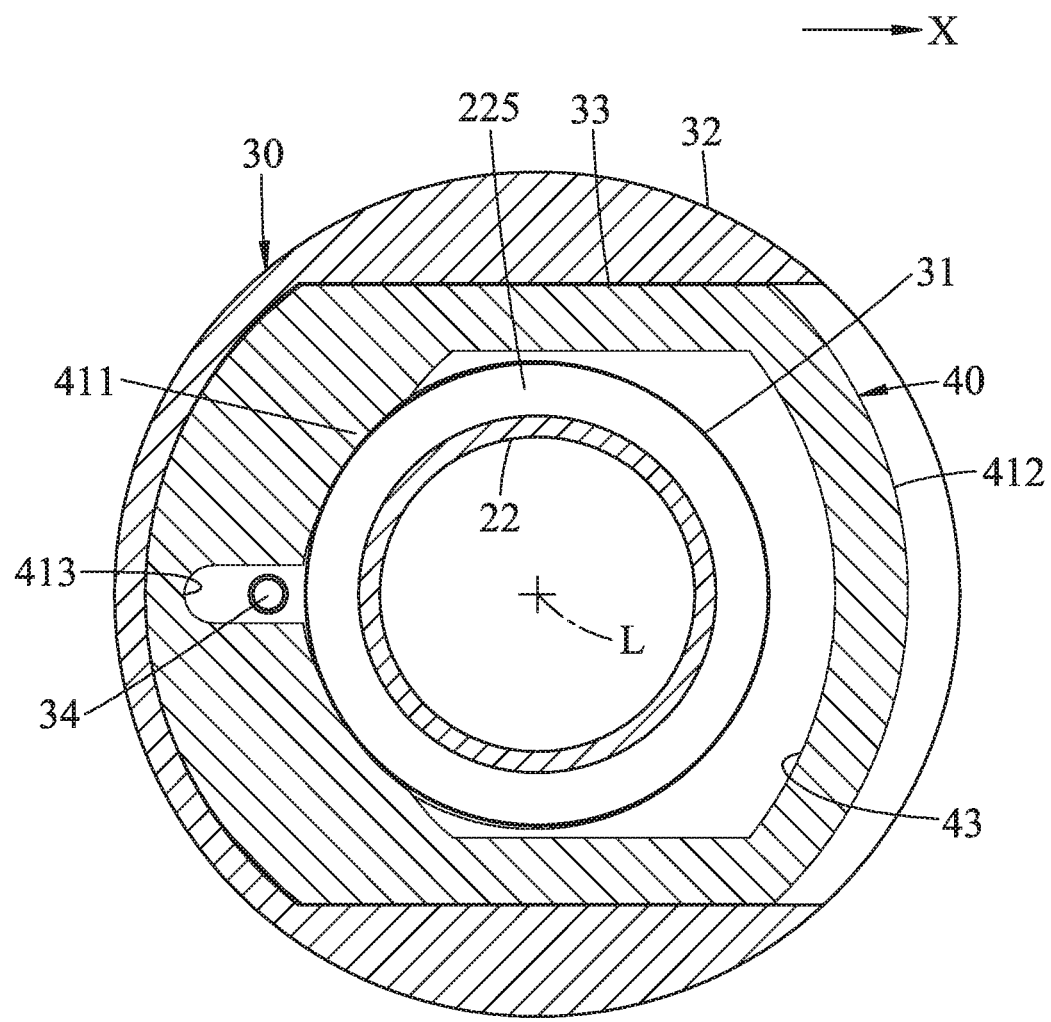
FIG. 6 is a cross-sectional view taken along line VI-VI of FIG. 5.

As shown in FIGS. 3 and 4, the latch block 40 is disposed in the latch bore 33, and defines therein a through hole 43 for passage of the second tube unit 20. The latch block 40 includes an actuating end region 412 and a blocking end region 411 which are at two opposite sides of the through hole 43. The latch block 40 is slidable in the latch bore 33 such that in response to pressing of the actuating end region 412 toward the limiting surface 330, the latch block 40 is displaced from a locked position to an unlocked position. In the locked position, as shown in FIGS. 3 and 4, the blocking end region 411 is in blocking engagement with the shoulder surface 221 to guard against the axial movement of the second tube member 21. In the unlocked position, as shown in FIGS. 5 to 7, the blocking end region 411 is disengaged from the shoulder surface 221 so as to permit the axial movement of the second tube member 21. In an embodiment shown in FIG. 3, the blocking end region 411 is disposed in a cavity defined between the shoulder surfaces 221, 225 when the latch block 40 is in the locked position.

In an embodiment shown in FIGS. 3 to 5, the telescoping assembly further includes a guiding pin 34 disposed in the latch bore 33 in proximity to the limiting surface 330. The latch block 40 has a guided slot 413 which is formed in the blocking end region 411 and which is configured to receive therein the guiding pin 34 so as to permit a guided movement of the latch block 40 in the radial direction (X).

In an embodiment shown in FIG. 4, the guided slot 413 extends along a first axis (L1) in the radial direction (X) into the through hole 43. The through hole 43 has a first dimension along the first axis (L1), and a second dimension which is defined along a second axis (L2) transverse to the longitudinal axis (L) and the first axis (L1), and which is smaller than the first dimension.

In an embodiment shown in FIG. 3, the latch block 40 further includes a tab 414 extending upwardly from the actuating end segment 412 to facilitate manual operation. The upper segment 301 of the outer sleeve 30 has an opening 331 which extends radially to provide access to the first coupling end 11, and which is configured to accommodate the movement of the tab 414. The telescoping assembly further includes a biasing member 42 disposed between the first coupling end 11 and the tab 414 to bias the latch block 40 to the locked position.

In an embodiment, the biasing member 42 is a compression spring.

In the embodiment shown in FIG. 3, the inner tubular member 22 has a single one of the shoulder surface 221. In other not-shown embodiments, the inner tubular member 22 may extend further along the longitudinal axis (L) to define a plurality of the shoulder surfaces 221 which are displaced from each other in the longitudinal axis (L), so as to permit the second tube member 21 to be kept at different positions between the extended position and the retracted position.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A telescoping assembly comprising:
a first tube member having a first coupling end, and having a first inner peripheral surface which defines a first axial bore;
a second tube unit including
a second tube member which has a second coupling end telescopically connected to said first coupling end along the longitudinal axis, and which is axially movable between an extended position, where said second tube member extends out of said first axial bore, and a retracted position, where said second tube member is received in said first axial bore, and
an inner tubular member which is coupled to said second coupling end to move with said second tube member inside said first axial bore, and which defines a shoulder surface; and
an outer sleeve including
an upper segment configured to be sleeved on and in frictional engagement with said first coupling end,
a lower segment configured to be slidably engaged with said second tube member so as to permit said second tube member to move relative to said outer sleeve, and
a middle segment disposed between said upper and lower segments, and having a first wall region and a second wall region which are opposite to each other in a radial direction relative to the longitudinal axis, characterized in that
said middle segment has a latch bore which extends in the radial direction through said first wall region and into said second wall region to terminate at a limiting surface; and
said telescoping assembly further comprising a latch block which is disposed in said latch bore, and which defines therein a through hole for passage of said second tube unit, said latch block including an actuating end region and a blocking end region which are at two opposite sides of said through hole, said latch block being slidable in said latch bore such that in response to pressing of said actuating end region toward said limiting surface, said latch block is displaced from a locked position, where said blocking end region is in blocking engagement with said shoulder surface, to an unlocked position, where said blocking end region is disengaged from said shoulder surface.

2. The telescoping assembly according to claim 1, characterized in that
said second tube member defines therein a second axial bore at said second coupling end, and
said inner tubular member has
a distal end segment,
a proximate end segment fitted in said second axial bore to permit said inner tubular member to move with said second tube member in said first axial bore, and
a neck portion disposed between said distal and proximate end segments, and forming, with said distal end segment, said shoulder surface.

3. The telescoping assembly according to claim 1, further characterized by a guiding pin disposed in said latch bore in proximity to said limiting surface, said latch block having a guided slot which is formed in said blocking end region and which is configured to receive therein said guiding pin so as to permit a guided movement of said latch block in the radial direction.

4. The telescoping assembly according to claim 3, characterized in that said guided slot extends along a first axis in the radial direction into said through hole, said through hole having a first dimension along the first axis, and a second dimension which is defined along a second axis transverse to the longitudinal axis and the first axis, and which is smaller than the first dimension.

5. The telescoping assembly according to claim 1, characterized in that
said latch block further includes a tab extending upwardly from said actuating end segment to facilitate manual operation, and
said upper segment of said outer sleeve has an opening which extends radially to provide access to said first coupling end, and which is configured to accommodate the movement of said tab,
said telescoping assembly further comprising a biasing member disposed between said first coupling end and said tab to bias said latch block to the locked position.

* * * * *